United States Patent Office 3,549,449
Patented Dec. 22, 1970

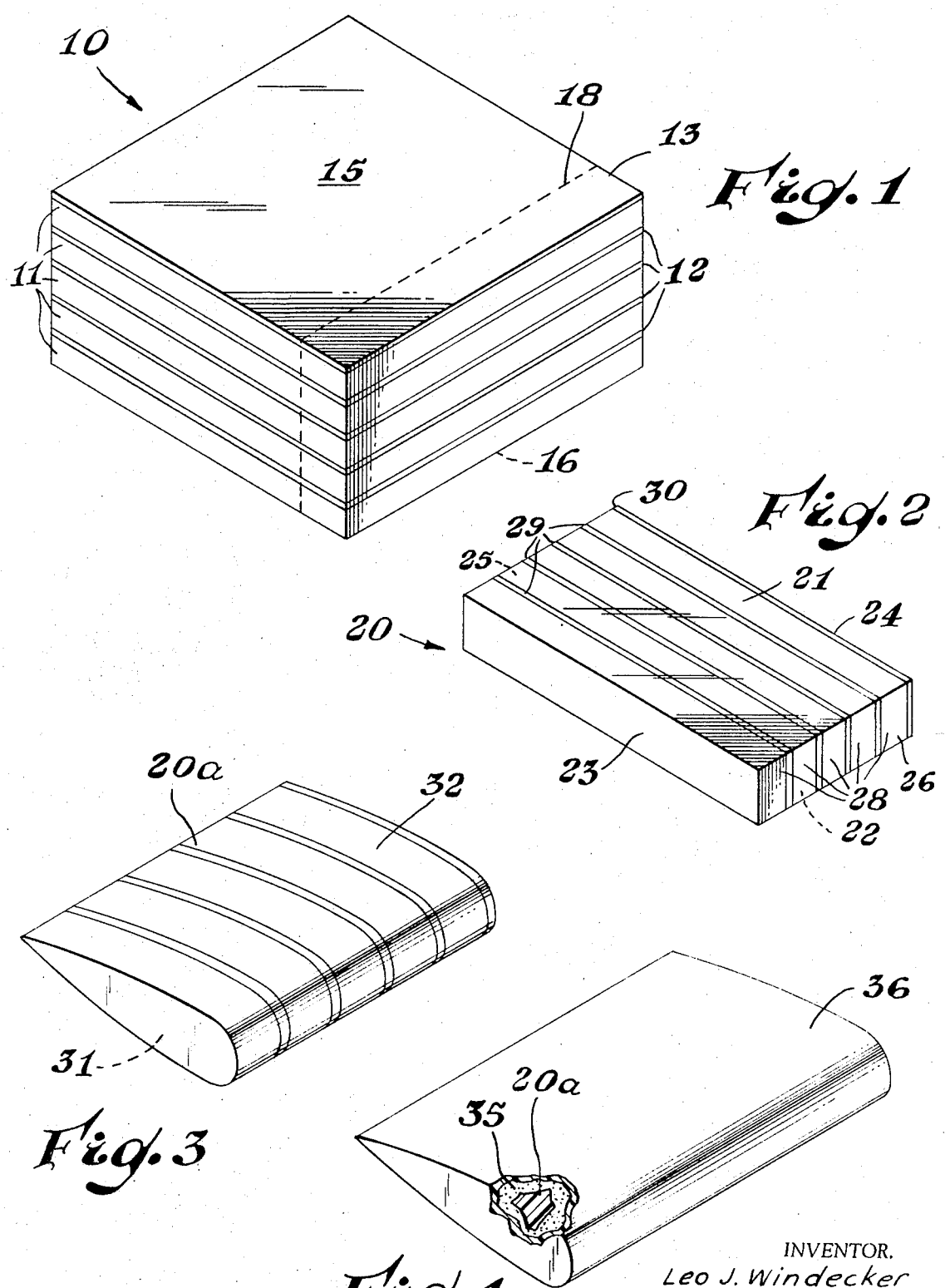

3,549,449
METHOD FOR THE PREPARATION OF A COMPOSITE PLASTIC - CONTAINING PRODUCT AND ARTICLE PRODUCED THEREBY
Leo J. Windecker, Midland, Tex., assignor to The Dow Chemical Company, Midland, Mich., a corporation of Delaware
Filed Sept. 29, 1967, Ser. No. 671,794
Int. Cl. B32b 31/18
U.S. Cl. 156—254           5 Claims

ABSTRACT OF THE DISCLOSURE

A composite article having strengthening ribs is prepared by stacking the desired laminations, adhering them together, severing sheets from the laminate and subsequently shaping the sheets to provide a composite article with high strength members extending generally between the major surfaces.

---

This invention relates to a method for the preparation of a composite plastic article containing foamed synthetic resin and the article produced thereby, and more praticularly relates to the preparation of a composite article containing discrete areas of synthetic resinous foam material having reinforcing elements therein and the resultant article.

In many instances, it is desired to produce composite articles which incorporate foamed synthetic resinous material or foam plastics and employ high strength skins or surfaces and high strength reinforcing elements therein. Oftentimes, such composite articles are prepared by forming a plurality of reinforcing elements, a plurality of foamed plastic elements and adhering such elements together, subsequently providing a high strength skin such as a filament reinforced sheet on the surface thereof. It is relatively time consuming to prepare and shape a plurality of elements and subsequently assemble them into a desired configuration such as a curved aircraft control surface, a flap, aileron or like structures. Frequently, when such composite structures are prepared, minor mis-alignment of the assembled parts often requires preparing the various elements to be assembled in such a manner that all have a dimension somewhat greater than the desired finished dimension of the product. This requires another shaping operation to prepare a finished core structure which is subsequently provided with a high strength skin. Oftentimes, many reinforced foam plastic shaped articles frequently are impractical if they require the shaping of a wide variety of small parts and subsequent assembly.

It would be desirable if there were available an improved method for the preparation of composite articles employing reinforcing material and synthetic resinous foam.

It would also be desirable if there were a method available which provided a simplified technique for the preparation of such reinforced articles.

It would also be beneficial if there were available a reinforced foam body which was readily shaped into a desired configuration and provided with a high strength skin.

It would also be desirable if there were available an improved high strength composite element having foam plastic elements and high strength reinforcing elements.

These benefits and other advantages in accordance with the method of the present invention are achieved by preparing a laminate structure by adhering together into a generally rigid configuration alternate layers of foam plastic and high strength reinforcing elements, severing the laminate in a direction generally normal to the plane of the elements forming the laminate thereby forming a sheet comprising alternate foam plastic elements and high strength reinforcing elements, the resultant sheet having edges and major surfaces, the high strength reinforcing elements extending from a pair of opposed edges and between the major surfaces, forming the sheet into a desired configuration, subsequently adhering to the foamed sheet a high strength surface.

Also contemplated within the scope of the present invention is a composite reinforced article, the article having a generally sheet-like configuration, a plurality of generally planar reinforcing elements extending between major surfaces of the sheet-like configuration in generally spaced apart generally parallel relationship, at least one foam plastic element disposed between and adhered to the high strength elements, a high strength reinforcing skin adhered to at least the major surfaces of the composite article.

The method of the present invention may be practiced employing any synthetic resinous foam either of the closed-cell variety or the open-celled variety, rigid or flexible. Generally, where the foam core is employed for structural purposes, it is desirable to employ a rigid plastic foam such as polystyrene foam, rigid polyurethane foam, epoxy foams, rigid nylon foams, polypropylene foams, phenol-formaldehyde foams, resorcinol foams or rigid foams such as are described in my U.S. Pat. 3,269,887. Fexible foams are employed primarily for their vibration value as the rigid foams contribute significantly to the structural strength of the finished article. A wide variety of sheet-like reinforcing materials may be employed including metal, wood, synthetic resinous sheets. Particularly desirable for many applications are synthetic resinous sheets which contain fibrous reinforcing elements such as fiber reinforced epoxy resin sheets which are obtained by impregnating glass fiber cloth or glass fibers with a suitable hardening resin such as an epoxy resin and curing to the desired configuration.

In the practice of the method of the present invention, synthetic foam reinforcing element laminates are prepared by conventional techniques wherein the synthetic resinous foams which are usually available in sheet form are laminated to sheets of reinforcing material to form a foam reinforcing laminate as thick and as wide or long as the desired finished product. Alternately, if the finished product is of a size significantly greater than that which can be conveniently obtained by laminating available sheets, each lamina may comprise two or more sheets of foam plastic or reinforcing material, the resultant laminate preferably having the binder between the laminates stacked. The laminate once prepared is then cut into sheets whose faces correspond to the ends or sides of the initial laminate. The sheets, if smaller than desired, may then be further joined in an edge to edge relationship to provide an element of the desired size. The resultant sheets are then shaped to a desired configuration such as one having a curved surface and provided with a suitable high strength skin which may be like or unlike the reinforcing elements, depending upon the end use desired. The present invention is of particular advantage when articles having curved surfaces are prepared.

The method and article of the present invention will be further clarified with reference to the drawing wherein:

FIG. 1 schematically depicts a laminate of foam plastic and reinforcing elements.

FIG. 2 depicts a view of a sheet prepared from the laminate of FIG. 1.

FIG. 3 shows a shaped article prepared from the sheet of FIG. 2.

FIG. 4 shows the article of FIG. 3 having a high strength skin adhered thereto.

In FIG. 1 there is depicted a laminate generally designated by the reference numeral 10. The laminate 10 comprises a plurality of sheets of synthetic resinous foam material designated by the reference numeral 11. Interdigitated between the sheets 11 are a plurality of reinforcing high strength sheets 12 and on one major surface of the laminate 10 is a high strength reinforcing element 13 which forms one major surface 15 of the laminate 10 and a remaining major surface of the laminate is designated by the reference numeral 16. The reinforcing sheets or elements 13 are adhered to the adjacent foam layers or sheets 11 by means of an adhering means or adhesive, not shown. A dotted line 18 is disposed adjacent one end of the laminate 10 and indicates the manner in which the laminate 10 is cut or sliced to provide a reinforced foam plastic sheet such as the sheet 20 of FIG. 2.

The sheet 20 of FIG. 2 has a first major face 21, a second major face 22, a first end 23, a second end 24 and a first side 25 and a second side 26. The sheet 20 comprises a plurality of synthetic resinous foam or cellular elements 28 extending from edge to edge and from face to face. A plurality of high strength reinforcing elements 29 are interdigitated between the adjacent foam elements 28 and also extend from edge to edge and face to face. A high strength reinforcing element 30 is disposed at the second end 24 of the sheet 20 and forms the end surface thereof.

In FIG. 3 there is depicted a formed sheet 20a formed from the sheet of 20 of FIG. 2. The sheet 20a has a first curved surface 32 and a second curved surface 31. The curved surfaces 32 and 31 have been formed by removal of an appropriate portion of the laminate 20 adjacent the surfaces 21 and 22.

In FIG. 4 there is depicted a composite element in accordance with the present invention which comprises the core or shaped sheet 20a of FIG. 3 having disposed on the external surface thereof an adhering means or adhesive element 35. The adhesive element 35 is covered by a high strength element 36 which conforms to the external configuration of the sheet 20a.

Beneficially, in the practice of the present invention, composite sheets, such as the sheet 20, when prepared from synthetic resinous foams are readily shaped by a variety of means, including shaped abrasive drums, routers, planers, milling machines and the like. A shaped abrasive drum is particularly advantageous and beneficial when the reinforcing elements such as the elements 29 of FIG. 2 are composed of glass fiber reinforced synthetic resinous sheets.

By way of further illustration, a laminate of the general nature of the laminate 10 of FIG. 1 is prepared employing sheets of rigid polyurethane foam having a thickness of about 4 inches and reinforcing elements of polyester fiber glass sheets having a thickness of about 0.52 inch, the foam and reinforced polyester sheets being adhered together with an epoxy resin adhesive to form a laminate having a thickness of about 30 inches. The resultant laminate is cut by means of a band saw to provide sheets about 30 inches in width and having a thickness of about 3.5 inches. The resultant sheets are shaped to provide a cross-sectional configuration of an aileron wherein the major surfaces thereof are curved by means of a pair of rapidly rotating shaped drums having an abrasive coating on the surface thereof, the sheet being inserted into the space between the curved surfaced drums in a direction opposite to the rotation thereof. The resultant sheet has a relatively smooth surface and the desired configuration. Shaped glass fiber reinforced polyester sheets having a thickness of about 0.062 inch are adhered to the exposed surface of the shaped laminate by means of an epoxy resin adhesive to provide an aileron section having high strength and desirably curved surfaces. Suitable bearings are subsequently affixed to the aileron by means of epoxy resin and glass roving.

In a manner similar to the foregoing illustration, other high strength articles, including aircraft surfaces such as control surfaces, are provided employing other synthetic resinous foams and reinforcing sheet elements.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. A method of preparing a laminate structure, the steps of the method comprising
adhering together in a generally rigid configuration alternate layers of foam plastic and high strength reinforcing element,
severing the laminate in a direction generally normal to the plane of the elements forming the laminate, thereby
forming a sheet comprising alternate foam plastic elements and high strength reinforcing elements, the resultant sheet having edges and major surfaces, the high strength reinforcing elements extending from a pair of opposed edges and between the major surfaces,
forming the sheet into a desired configuration, and subsequently
adhering to the foam sheet a high strength surface element.

2. The method of claim 1 wherein the sheet is formed to provide a generally curved major surface.

3. The method of claim 1 wherein the high strength reinforcing elements are glass fiber reinforced plastic sheets.

4. The method of claim 3 wherein the plastic foam is a rigid polyurethane foam.

5. The method of claim 1 wherein the high strength skin is adhered to the formed sheet employing an adhesive.

References Cited

UNITED STATES PATENTS

| | | | |
|---|---|---|---|
| 2,728,702 | 12/1955 | Simon et al. | 244—133 X |
| 2,943,009 | 6/1960 | Mirsky et al. | 156—153 |
| 3,002,534 | 10/1961 | Noland et al. | 156—161 |
| 3,230,995 | 1/1966 | Shannon | 156—250 X |
| 3,303,076 | 2/1967 | Carlson, Jr. et al. | 161—161 X |

VERLIN R. PENDEGRASS, Primary Examiner